United States Patent
South et al.

(10) Patent No.: US 9,011,683 B2
(45) Date of Patent: Apr. 21, 2015

(54) FILTER CARTRIDGE CENTERING DEVICE

(75) Inventors: Kevin C. South, Cookeville, TN (US); Charles W. Hawkins, Sparta, TN (US)

(73) Assignee: Cummins Filtration IP Inc., Columbus, IN (US)

( * ) Notice: Subject to any disclaimer, the term of this patent is extended or adjusted under 35 U.S.C. 154(b) by 1642 days.

(21) Appl. No.: 12/271,545

(22) Filed: Nov. 14, 2008

(65) Prior Publication Data

US 2010/0122952 A1 May 20, 2010

(51) Int. Cl.
| | | |
|---|---|---|
| *B01D 29/96* | (2006.01) | |
| *F02M 37/22* | (2006.01) | |
| *B01D 29/11* | (2006.01) | |
| *B01D 35/30* | (2006.01) | |

(52) U.S. Cl.
CPC ............ *F02M 37/22* (2013.01); *B01D 29/114* (2013.01); *B01D 35/30* (2013.01); *B01D 2201/291* (2013.01); *B01D 2201/302* (2013.01); *B01D 2201/316* (2013.01); *B01D 2201/34* (2013.01); *B01D 2201/4046* (2013.01); *B01D 2201/4084* (2013.01)

(58) Field of Classification Search
CPC ..................................................... B01D 29/114
USPC ................... 210/232, 437, 438, 457
See application file for complete search history.

(56) References Cited

U.S. PATENT DOCUMENTS

| | | | | |
|---|---|---|---|---|
| 3,503,511 | A | * | 3/1970 | Spitzberg .................. 210/232 |
| 5,695,637 | A | * | 12/1997 | Jiang et al. .................. 210/316 |
| 5,770,065 | A | * | 6/1998 | Popoff et al. .................. 210/232 |
| 6,015,492 | A | | 1/2000 | Popoff et al. |
| 6,471,070 | B2 | | 10/2002 | Janik |
| 6,884,349 | B1 | | 4/2005 | Jiang |
| 2002/0014452 | A1 | * | 2/2002 | Janik ........................... 210/437 |
| 2007/0095744 | A1 | * | 5/2007 | Bagci et al. ................. 210/435 |
| 2007/0227964 | A1 | | 10/2007 | Fick et al. |
| 2009/0020465 | A1 | | 1/2009 | Jiang et al. |

FOREIGN PATENT DOCUMENTS

EP         1008375         6/2000

OTHER PUBLICATIONS

International Search Report for international application No. PCT/US2009/063982, dated Jun. 28, 2010 (4 pages).
Written Opinion of the International Searching Authority for international application No. PCT/US2009/063982, dated Jun. 28, 2010 (4 pages).
Chinese Office Action Translation for Chinese Application No. 200980146225.5, received Dec. 8, 2013, 22 pages.

* cited by examiner

*Primary Examiner* — Tony G Soohoo
*Assistant Examiner* — Peter Keyworth
(74) *Attorney, Agent, or Firm* — Foley & Lardner LLP (57) ABSTRACT

A filter cartridge is provided. The filter cartridge includes a first end plate connected to a first end of a filter media, a second end plate connected to a second end of the filter media and a centering device. The centering device is located towards the second end of the filter media for aligning a pin of the first end plate into a hole of a filter housing. The centering device also includes first ribs at first opposing ends of the centering device and second ribs at second opposing ends of the centering device, the first and second ribs protruding inwardly toward the center of a centering device hole. The length of the first ribs towards the center of the centering device hole and the length of the second ribs towards the center of the centering device hole are designed to align with a cross-sectional shape of the standpipe hole.

15 Claims, 7 Drawing Sheets

FILTER CARTRIDGE CENTERING DEVICE

FIELD

This disclosure generally pertains to the field of filtration, and more particularly to a filter cartridge centering device for a filter cartridge used in filtration systems, for example a fuel filtration system.

BACKGROUND

Fuel filtration systems designed to prevent the flow of fuel to an engine if no filter cartridge is installed or in the incorrect filter cartridge is installed are known. In these "no filter, no run" systems, not only must the correct filter be used, but the filter must be correctly inserted into the filter housing, in order to allow fuel to flow to the engine. However, often times radial movement of the filter cartridge occurs as the cartridge is inserted into the filter housing, thereby preventing proper alignment of the filter cartridge in the filter housing.

SUMMARY

This application describes a filter cartridge centering device for a filter cartridge used in filtration systems. In one embodiment, a filter cartridge is provided. The filter cartridge includes a filter media including a central axis with a first end and a second end, a first end plate connected to the first end of the filter media, and a second end plate connected to the second end of the filter media. The first end plate includes a pin that extends from the first end plate along a direction normal to the first end plate. The second plate includes a standpipe hole formed at the center of the second end plate that is configured to allow passage of a standpipe of a filter housing, a skirt that extends through the second plate and a gasket seal secured to an inner surface of the skirt. The filter cartridge also includes a centering device located towards the second end of the filter media for aligning the pin of the first end plate into a hole of a filter housing. The centering device includes a centering device hole, first ribs at first opposing ends of the centering device that protrude inwardly toward the center of the centering device hole and second ribs at second opposing ends of the centering device that protrude inwardly toward the center of the centering device hole. The length of the first ribs towards the center of the centering device hole and the length of the second ribs towards the center of the centering device hole are designed to align with a cross-sectional shape of the standpipe.

In another embodiment, a filter assembly is provided. The filter assembly includes a filter housing and a filter cartridge. The filter housing includes a side wall and an end wall defining a filter cartridge space for receiving the filter cartridge. The filter housing also includes a hollow standpipe secured to the end wall that extends into and through the filter cartridge space with a hole at a first end of the standpipe. The filter cartridge includes a filter media with a first end plate connected to a first end of the filter media, and a second end plate connected to a second end of the filter media. The filter media includes a central axis. The first end plate includes a pin that extends from the first end plate along a direction normal to the first end plate. The second end plate includes a standpipe hole formed at the center of the second end plate that is configured to allow passage of a standpipe of a filter housing, a skirt that extends through the second end plate and a gasket seal secured to an inner surface of the skirt. The filter cartridge also includes a centering device located towards the second end of the filter media that includes a centering device hole, first ribs at first opposing ends of the centering device that protrude inwardly toward the center of the centering device hole and second ribs at second opposing ends of the centering device that protrude inwardly toward the center of the centering device hole. The length of the first ribs towards the center of the centering device hole and the length of the second ribs towards the center of the centering device hole are designed to align with a cross-sectional shape of the standpipe.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice what is claimed, and it is to be understood that other embodiments may be utilized without departing from the spirit and scope of the claims. The following detailed description is, therefore, not to be taken in a limiting sense.

The embodiments described herein are directed to a filter cartridge centering device for a no-filter, no run designed filter cartridge. When inserting the filter cartridge into the filter housing, the filter centering device provides guides that prevent radial movement of the filter cartridge to ensure that the cartridge aligns properly with the filter housing for a proper fitting.

Figure 1:
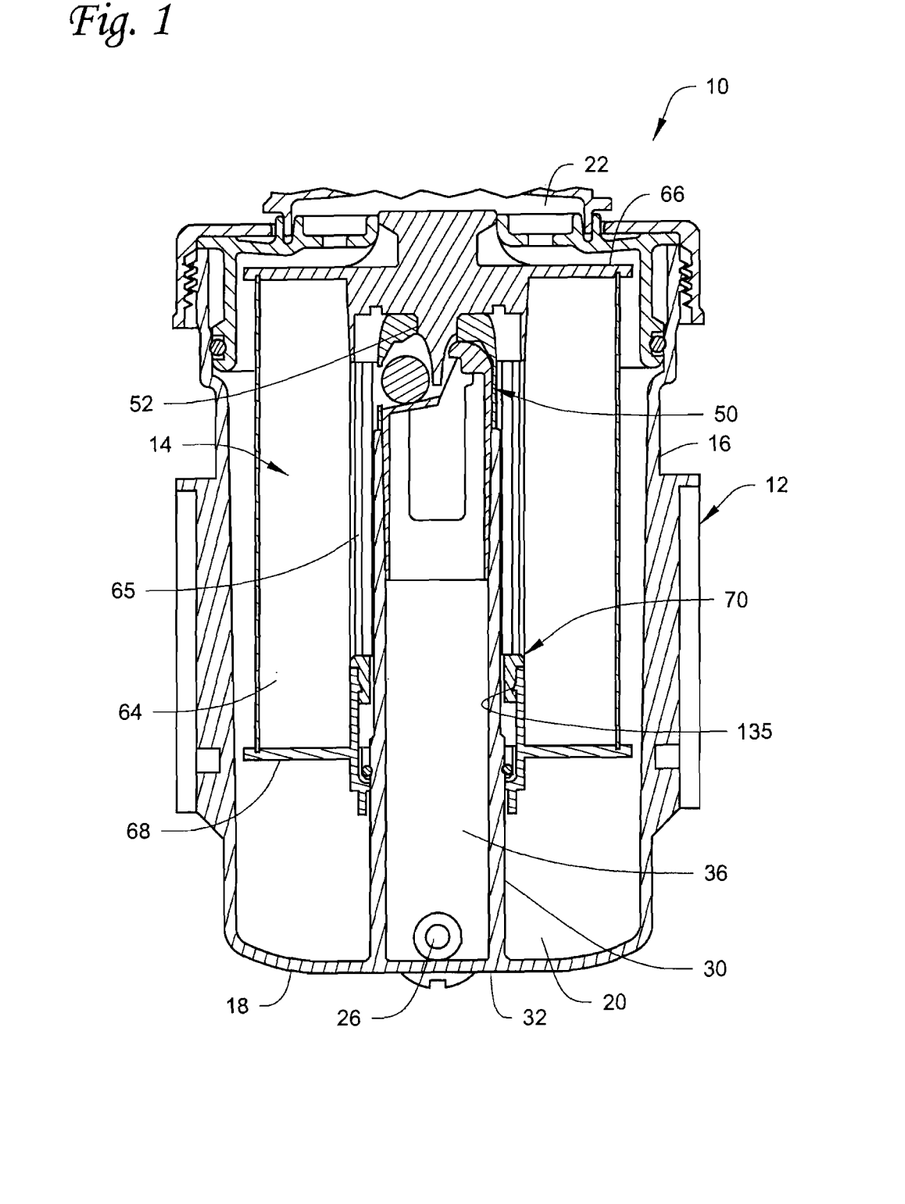
FIG. 1 is a sectional view of a filter assembly that includes a filter cartridge in a filter housing.

FIG. 1 illustrates a filter assembly 10, for example a fuel filter assembly, which is intended to filter a fluid, for example diesel fuel, and remove water from the fluid before the fluid reaches a protected system, for example a fuel injection pump and fuel injectors. This description will hereinafter describe the fluid as fuel. However, it is to be realized that the concepts described herein can be used for other fluids. And, in appropriate circumstances, one or more of the concepts described herein can be applied to other types of filter assemblies that filter other types of fluids, for example lubrication, hydraulic and other liquids, as well as air. In addition, in appropriate circumstances, the concepts described herein can be used to remove contaminants other than water from the fluid.

Figure 2:
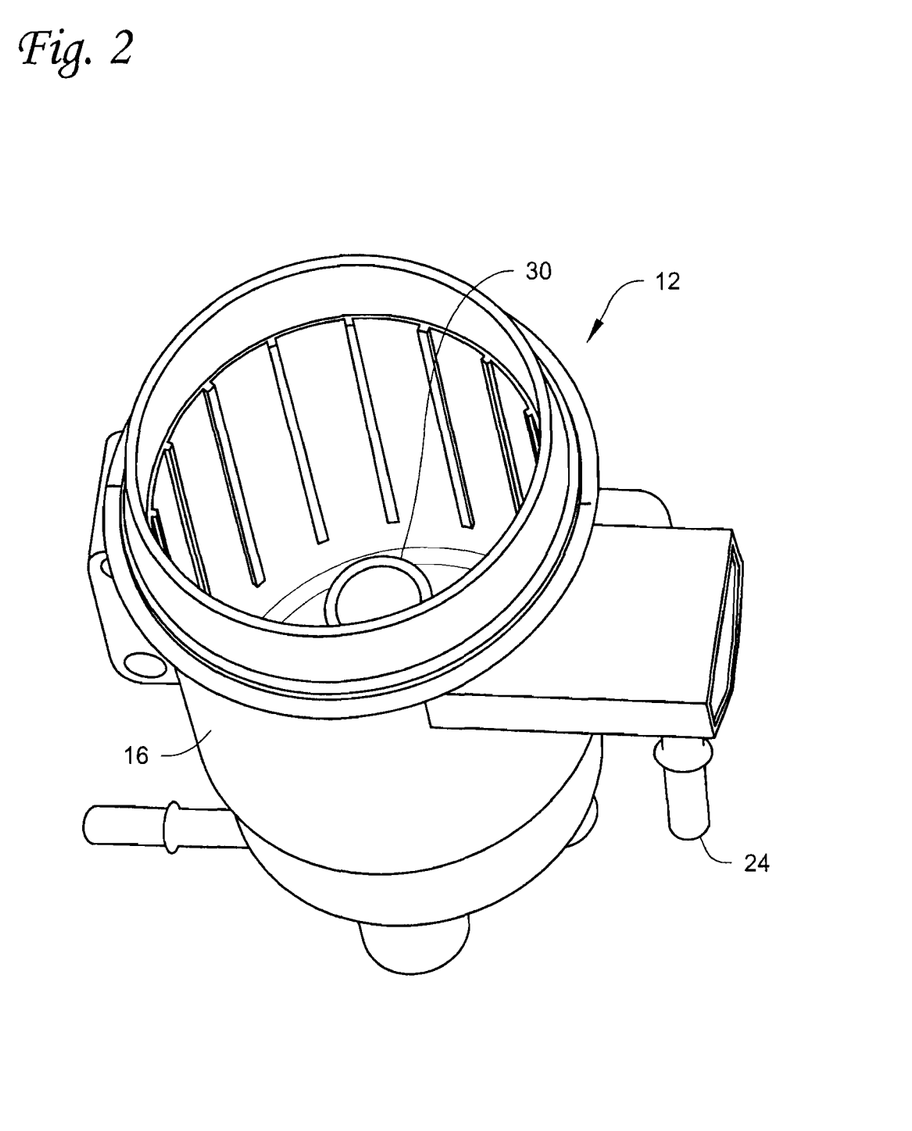
FIG. 2 is a perspective view of the filter housing with the lid removed to show the interior of the housing.

The assembly 10 includes a filter housing 12 that is designed to receive a filter cartridge 14 therein for filtering the fluid. The filter housing 12 includes a housing body that has a side wall 16 and an end wall 18. The side wall 16 and the end wall 18 define a filter cartridge space 20 that is large enough to receive the filter cartridge 14 therein, with the end wall 18 forming a closed end of the space 20. The housing 12 also includes an inlet opening 24 (FIG. 2) through which fuel to be filtered enters the space 20, and an outlet 26, illustrated as extending from the side wall 16, through which fuel exits on its way to the engine. It is to be realized that the filter housing 12 could have other configurations than that described herein.

A fluid passageway member in the form of a standpipe 30 is secured to the end wall 18 and extends upwardly into the space 20. In the illustrated embodiment, the standpipe 30 is generally hollow from its end 32 connected to the end wall 18 to a tip end thereof, thereby defining an internal flow passage 36. The flow passage 36 is in communication with the outlet 26 so that fuel that enters the standpipe 30 can flow from the standpipe and into the outlet 26 to the engine. The standpipe 30 can have a number of cross-sectional shapes, for example oval-shaped or circular. An example of an oval standpipe is disclosed in U.S. Pat. No. 6,884,349 and in U.S. patent application Ser. No. 11/937,700.

The standpipe 30 includes a hole 52 (FIG. 3) at an upper end of the standpipe 30. A flow restriction valve 50 is disposed near the upper end of the standpipe 30 to control the flow of fuel into the standpipe. The valve 50 can prevent fuel flow into the standpipe when the filter cartridge 14 is not installed or when an incorrect filter cartridge is installed. When the filter cartridge 14 or other appropriately designed filter cartridge is installed, the filter cartridge is designed to interact with the valve in such a manner as to keep the valve from preventing fuel flow into the standpipe. An example of a valve operating in this manner is disclosed in U.S. Pat. No. 6,884,349 and in U.S. patent application Ser. No. 11/937,700.

The filter cartridge 14 includes a filter media 64, a centertube 65, an upper end plate 66, a lower end plate 68 and a filter cartridge centering device 70. The upper end plate 66 is secured to an upper end of the media 64 and the centertube 65. The lower end plate 68 is secured to a bottom end of the media 64 and the centertube 65. The media 64 and the centertube 65 are each cylindrical, and the centertube 65 is formed to provide structural integrity and support for the media 64.

Figure 4:
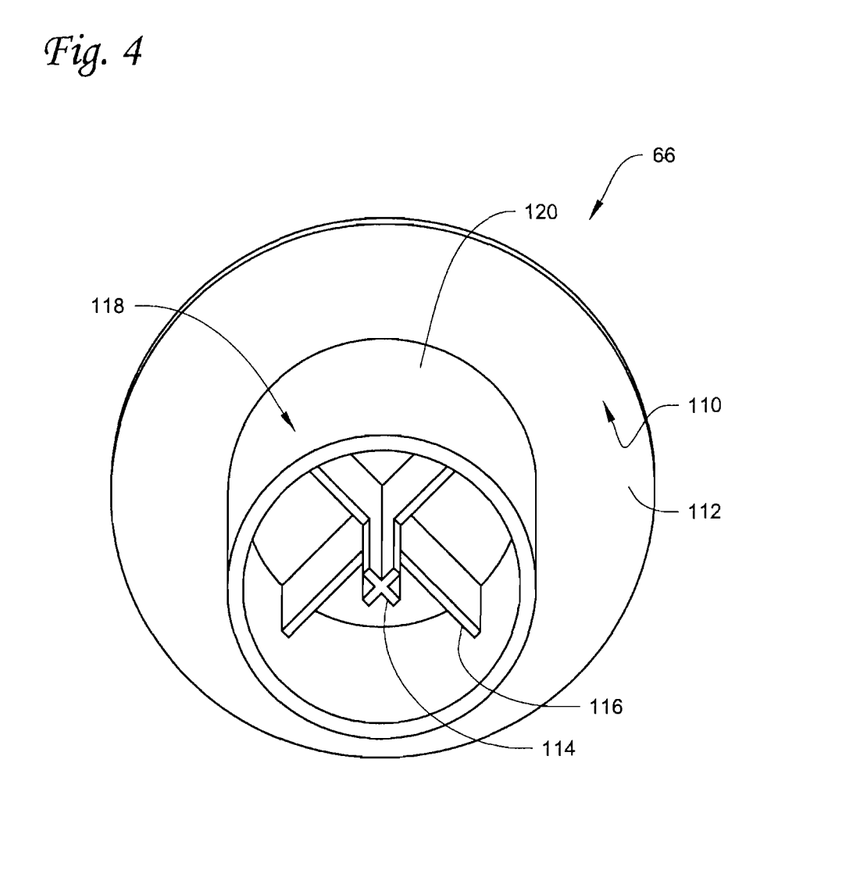
FIG. 4 is a perspective view of the upper end plate.
Figure 5:
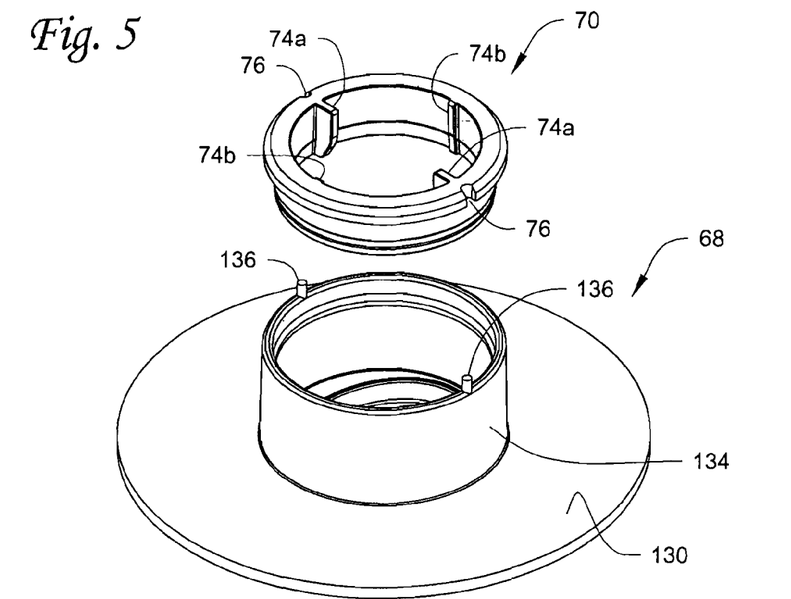
FIG. 5 is a perspective view of the lower end plate and a filter cartridge centering device.
Figure 6:
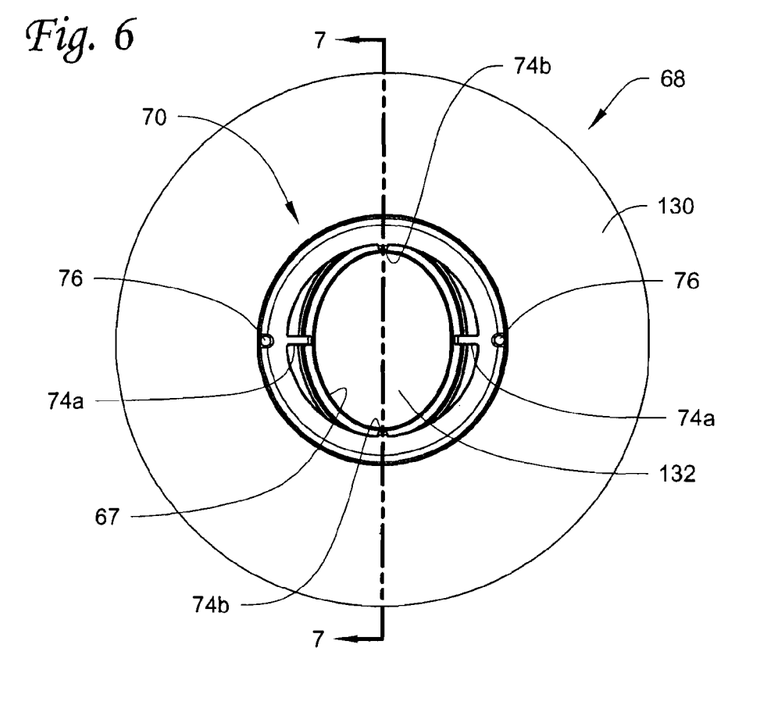
FIG. 6 is a top view of the lower end plate with a filter cartridge centering device secured thereto.
Figure 7:
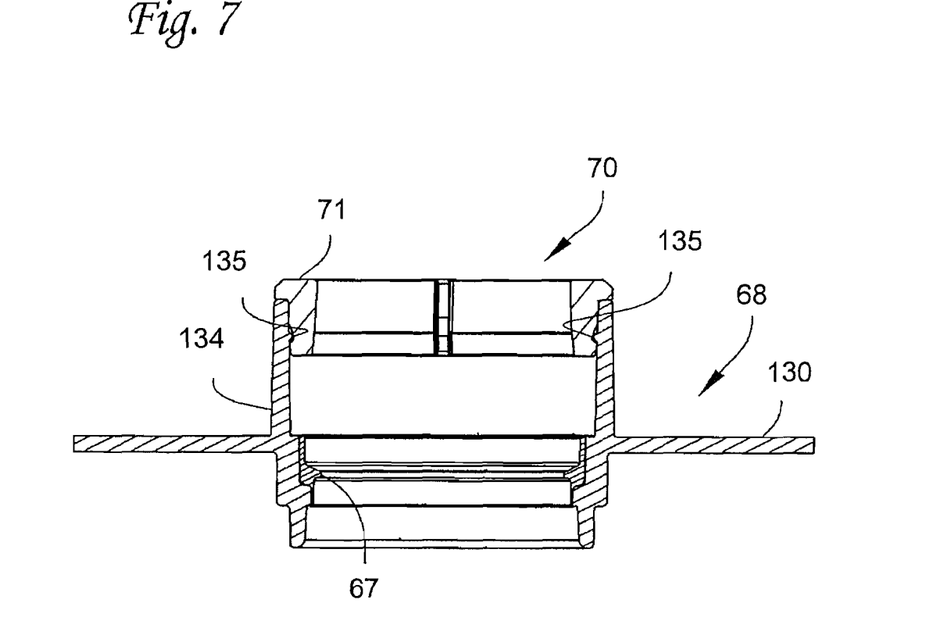
FIG. 7 is a cross-sectional view of the lower end plate with a filter cartridge centering device secured thereto.

As shown in FIG. 4, the upper end plate 66 includes a generally circular, horizontal plate 110. The plate 110 includes a perimeter portion 112 that is suitably attached to the upper end of the filter media 64. A pin 114 projects downwardly from the center of the plate 110. The pin 114 is designed to interact with the valve 50 in the manner described in U.S. Pat. No. 6,884,349 and in U.S. patent application Ser. No. 11/937,700.

Extending downward from the plate 110, and surrounding the pin 114 and ribs 116, is a protective skirt 118. The skirt 118 is illustrated as being substantially solid from one end to the other, and the base 120 of the skirt 118 that is connected to the plate 110 and to the ends of the ribs 116. If considered appropriate, holes or other flow enhancing means can be provided in the skirt 118 to facilitate the flow of fuel past the skirt and into the standpipe 30. The pin 114 is connected to the plate 110 via four stiffening ribs 116 which provide stiffening to the pin 114. The pin 114 and the skirt 118 function as described in U.S. patent application Ser. No. 11/937,700.

Figure 3:
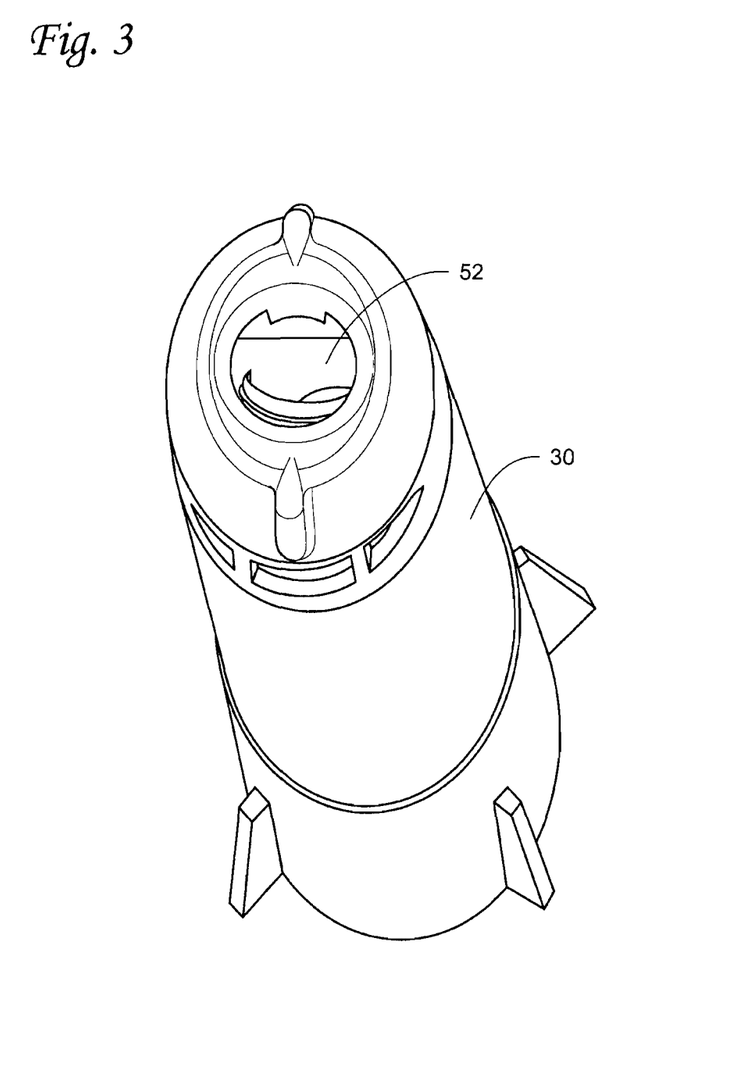
FIG. 3 is a perspective view of the standpipe.

The lower end plate 68 is illustrated in FIGS. 1, 5, 6 and 7. The lower end plate 68 includes a generally ring shaped, horizontal plate 130 which is suitably attached to the bottom end of the filter media 64 (FIG. 1). A standpipe hole 132 is formed at the center of the plate 130 which is configured to allow passage of the standpipe 30 (FIGS. 1 and 3). The lower end plate 68 also includes a generally circular skirt 134 that extends through the horizontal plate 130 and a gasket seal 67 secured to an inner surface of the skirt 134. The gasket seal 67 has a shape similar to the cross-sectional shape of the standpipe 30, for example oval. However, if the standpipe has a different shape, for example circular, then the gasket 67 would also be circular. The skirt 134 centers the filter media 64 onto the horizontal plate 130. The skirt 134 includes radial retaining bumps 135 along an interior surface of the skirt 134.

Figure 8:
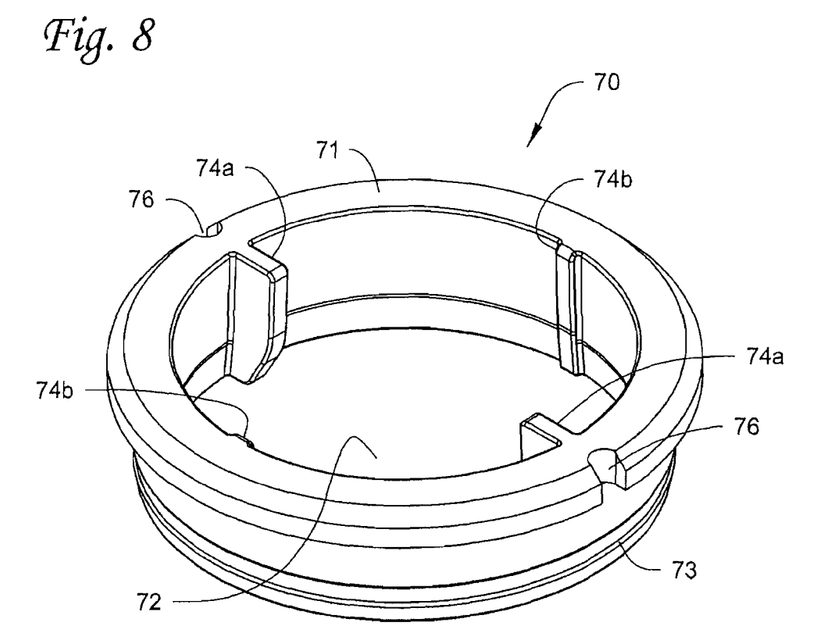
FIG. 8 is a perspective view of a filter cartridge centering device.

As shown in FIG. 8, the centering device 70 is generally ring shaped with a circular hole 72 and includes an upper edge 71, a channel 73, guide ribs 74a, 74b and alignment holes 76. The guide ribs 74a, 74b protrude inwardly toward the center of the hole 72. The ribs 74a, 74b are designed to align with the shape of the standpipe 30. For example, if the standpipe 30 has an oval shape, guide ribs 74a protrude further into the hole 72 than the guide ribs 74b. This configuration creates a moment arm between the gasket seal 67 and the ribs 74a, 74b that prevents radial movement of the filter cartridge 14 as it is inserted into the filter housing 12. This allows the pin 114 on the upper end plate 66 to properly align with the hole 52 at the upper end of the standpipe 30.

As shown in FIGS. 1, 5, 6 and 7, the centering device 70 is secured to the skirt 134 of the lower end plate 68. The upper edge 71 protrudes outwardly to allow the centering device 70 to rest on top of the skirt 134 with a remaining portion of the centering device 70 being secured to an interior surface of the skirt 134, as shown in FIG. 1. The channel 73 also aligns and mates with the radial retaining bumps 135 of the skirt 134 to also secure the centering device 70 to the skirt 134. In some embodiments, the centering device 70 is molded into the skirt 134.

The alignment holes 76 are provided at the upper edge 71 of the centering device 70. The alignment holes 76 are a keying feature used during the manufacturing of the filter cartridge 14 that properly orients the ribs 74a, 74b to match the shape of the gasket seal 67 by mating with alignment pins 136 located on the skirt 134 or the centertube 65. In other embodiments, the centering device 70 may use other types of alignment features to replace the alignment holes 76 such as pins, flats, etc in order to align the ribs 74a, 74b of the centering device 70 to match the shape of the gasket seal 67.

Figure 9:
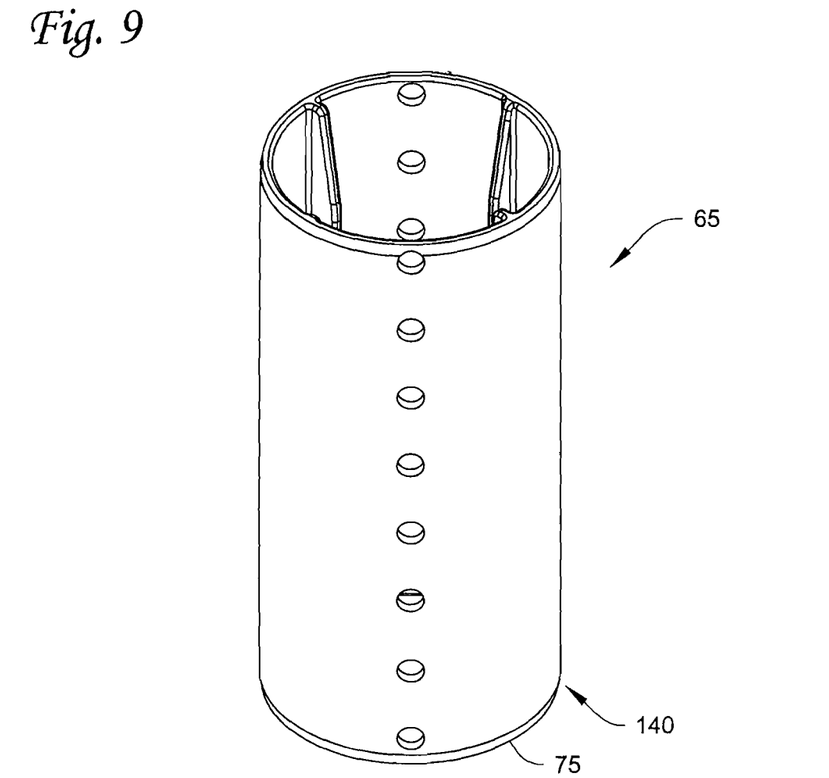
FIG. 9 is a side perspective view of a centertube with a filter cartridge centering device secured thereto.
Figure 10:
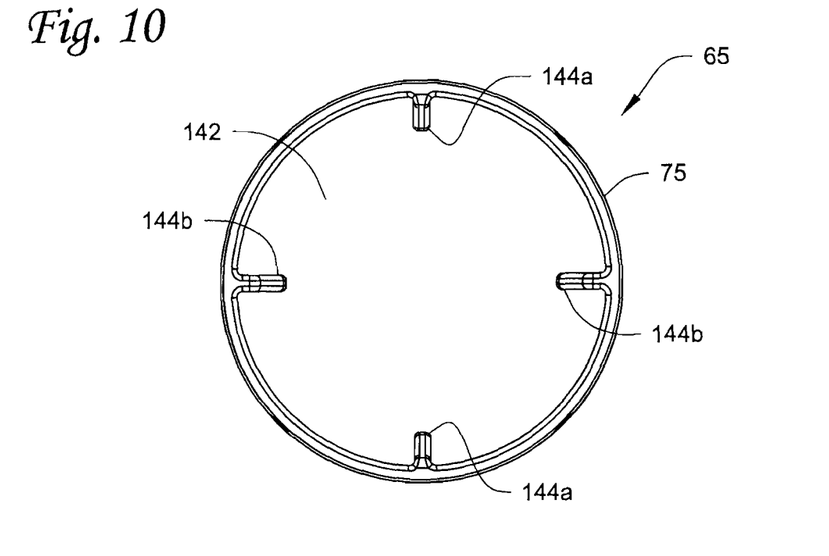
FIG. 10 is an end view of a centertube with a filter cartridge centering device secured thereto.

In other embodiments, depending on the configuration of the gasket seal 67, a filter cartridge centering device can also be secured to the centertube 65. FIG. 9 shows a side view of the centertube 65 with a bottom end 140 and a filter cartridge centering device 75 secured to the centertube 65. As shown in FIG. 10, the centering device 75 is secured near the bottom end 140 of the centertube 65. In this embodiment, the centering device 75 is generally ring shaped with a circular hole 142 and includes the guide ribs 144a, 144b. The guide ribs 144a, 144b protrude inwardly toward the center of the hole 142. The ribs 144a, 144b are designed to align with the shape of the standpipe 30. For example, if the standpipe 30 has an oval shape, guide ribs 144a protrude further into the hole 142 than the guide ribs 144b. This configuration creates a moment arm between the gasket seal 67 and the ribs 144a, 144b that prevents radial movement of the filter cartridge 14 as it is inserted into the filter housing 12. This allows the pin 114 on the upper end plate 66 to properly align with the hole 52 at the upper end of the standpipe 30.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A filter cartridge, comprising:
a filter media with a first end and a second end, a first end plate connected to the first end of the filter media, and a second end plate connected to the second end of the filter media, the filter media including a central axis;
the first end plate includes a pin that extends from the first end plate along a direction normal to the first end plate;
the second end plate includes a standpipe hole formed at the center of the second end plate that is configured to allow passage of a standpipe of a filter housing, a skirt that extends through the second end plate and a gasket seal secured to an inner surface of the skirt; and
a centering device located towards the second end of the filter media that includes a centering device body having a centering device hole, first ribs at first opposing locations of the centering device body that protrude inwardly toward the center of the centering device hole and second ribs at second opposing locations of the centering device body that protrude inwardly toward the center of the centering device hole,
wherein the length of the first ribs towards the center of the centering device hole and the length of the second ribs towards the center of the centering device hole are designed to align with a cross-sectional shape of the standpipe, and
wherein a portion of the centering device body is configured to fit within an interior portion of the skirt.

2. The filter cartridge of claim 1, wherein the centering device is secured to the skirt of the second end plate.

3. The filter cartridge of claim 1, further comprising a centertube located along the central axis of the filter media between the first end plate and the second end plate for supporting the filter media, wherein the centering device is secured to the centertube.

4. The filter cartridge of claim 1, wherein the centering device body further includes a first edge that protrudes outwardly and includes alignment holes for orienting the first ribs and second ribs of the centering device to align with the shape of the standpipe hole.

5. The filter cartridge of claim 1, wherein the centering device body further includes a first edge that protrudes outwardly of the centering device and rests on top of the skirt with the portion of the centering device body being secured to an interior surface of the skirt.

6. The filter cartridge of claim 1, wherein an interior surface of the skirt includes radial retaining bumps and the centering device body includes a channel to align and mate with the radial retaining bumps.

7. The filter cartridge of claim 1, wherein the centering device is molded into the skirt of the second end plate.

8. A filter assembly comprising:
a filter housing designed to receive a filter cartridge, the filter housing including:
a side wall and an end wall defining a filter cartridge space for receiving the filter cartridge;
a hollow standpipe, secured to the end wall and extending into and through the filter cartridge space, that includes a hole at a first end of the standpipe;
the filter cartridge including:
a filter media with an first end and a second end, a first end plate connected to the first end of the filter media, and a second end plate connected to the second end of the filter media, the filter media including a central axis;
the first end plate includes a pin that extends from the first end plate along a direction normal to the first end plate;
the second end plate includes a standpipe hole formed at the center of the second end plate that is configured to allow passage of a standpipe of a filter housing, a skirt that extends through the second end plate and a gasket seal secured to an inner surface of the skirt; and
a centering device located towards the second end of the filter media that includes a centering device body having a centering device hole, first ribs at first opposing locations of the centering device body that protrude inwardly toward the center of the centering device hole and second ribs at second opposing locations of the centering device body that protrude inwardly toward the center of the centering device hole,
wherein the length of the first ribs towards the center of the centering device hole and the length of the second ribs towards the center of the centering device hole are designed to align with a cross-sectional shape of the standpipe, and
wherein a portion of the centering device body is configured to fit within an interior portion of the skirt.

9. The filter assembly of claim 8, wherein the centering device is secured to the skirt of the second end plate.

10. The filter assembly of claim 8, further comprising a centertube located along the central axis of the filter media between the first end plate and the second end plate for supporting the filter media, wherein the centering device is secured to the centertube.

11. The filter assembly of claim 8, wherein the centering device body further includes a first edge that protrudes outwardly and includes alignment holes for orienting the first ribs and second ribs of the centering device to align with the shape of the standpipe hole.

12. The filter assembly of claim 8, wherein the centering device body further includes a first edge that protrudes outwardly of the centering device and rests on top of the skirt with the portion of the centering device body being secured to an interior surface of the skirt.

13. The filter assembly of claim 8, wherein an interior surface of the skirt includes radial retaining bumps and the centering device body includes a channel that aligns and mates with the radial retaining bumps.

14. The filter assembly of claim 8, wherein the cross-sectional shape of the standpipe is oval.

15. The filter assembly of claim 8, wherein the centering device is molded into the skirt of the second end plate.

* * * * *